(12) United States Patent
Asiano et al.

(10) Patent No.: US 9,577,936 B2
(45) Date of Patent: Feb. 21, 2017

(54) PACKETIZED RADIO FREQUENCY TRANSPORT SYSTEM

(71) Applicant: Kratos Integral Holdings, LLC, San Diego, CA (US)

(72) Inventors: William T. Asiano, Colorado Springs, CO (US); Douglas J. Heath, Aurora, CO (US); Daniel J. Sullivan, Monument, CO (US); John J. Meleski, Black Forest, CO (US); Timothy James Orndorff, Lessburg, VA (US); Thad Jay Genrich, Aurora, CA (US)

(73) Assignee: KRATOS INTEGRAL HOLDINGS, LLC, San Diego, CA (US)

( * ) Notice: Subject to any disclaimer, the term of this patent is extended or adjusted under 35 U.S.C. 154(b) by 121 days.

(21) Appl. No.: 14/509,710

(22) Filed: Oct. 8, 2014

(65) Prior Publication Data

US 2015/0244624 A1   Aug. 27, 2015

Related U.S. Application Data

(60) Provisional application No. 61/945,652, filed on Feb. 27, 2014.

(51) Int. Cl.
| | | |
|---|---|---|
| *H04L 12/28* | (2006.01) | |
| *H04L 12/801* | (2013.01) | |
| *H04L 12/46* | (2006.01) | |
| *H04L 1/00* | (2006.01) | |

(52) U.S. Cl.
CPC ............. *H04L 47/12* (2013.01); *H04L 1/0041* (2013.01); *H04L 1/0057* (2013.01); *H04L 12/4633* (2013.01)

(58) Field of Classification Search
CPC combination set(s) only.
See application file for complete search history.

(56) References Cited

U.S. PATENT DOCUMENTS

| | | | |
|---|---|---|---|
| 7,145,899 B1* | 12/2006 | Pearce | H04M 3/465 370/352 |
| 7,573,864 B2* | 8/2009 | Boland | H04J 3/0685 370/350 |
| 2001/0028725 A1* | 10/2001 | Nakagawa | G06T 1/0021 382/100 |
| 2003/0117986 A1* | 6/2003 | Thermond | H04L 63/10 370/338 |
| 2004/0062330 A1* | 4/2004 | LeBlanc | H04Q 1/457 375/355 |
| 2004/0064324 A1* | 4/2004 | Graumann | G10L 21/038 704/500 |

(Continued)

OTHER PUBLICATIONS

Normoyle "VITA 49 enhance capabilities and interoperability for transporting SDR data." Apr. 2008.*

(Continued)

*Primary Examiner* — Bob Phunkulh
(74) *Attorney, Agent, or Firm* — Procopio, Cory, Hargreaves & Savitch LLP

(57) ABSTRACT

Means for transporting multi-band RF spectrum over a digital network including: means for converting radio frequency signal into internet protocol packets; means for time stamping and preserving timing for the converted radio frequency signal; and means for transporting the radio frequency signal using a radio transport standard.

20 Claims, 14 Drawing Sheets

(56) References Cited

U.S. PATENT DOCUMENTS

| | | | |
|---|---|---|---|
| 2005/0091051 A1* | 4/2005 | Moriya | G10L 19/0017 704/229 |
| 2006/0126803 A1* | 6/2006 | Patel | H04M 3/5166 379/88.01 |
| 2006/0146735 A1* | 7/2006 | Shaffer | H04Q 11/04 370/260 |
| 2007/0195905 A1* | 8/2007 | Schatz | H04L 1/004 375/265 |
| 2008/0106465 A1* | 5/2008 | Suzuki | H04B 7/0811 342/367 |
| 2008/0291891 A1* | 11/2008 | Jerlhagen | H04L 43/0864 370/350 |
| 2009/0170430 A1* | 7/2009 | Rangan | H04J 3/0685 455/39 |
| 2011/0274116 A1* | 11/2011 | Ozawa | H04L 12/6418 370/401 |
| 2012/0020413 A1* | 1/2012 | Chen | H04N 19/597 375/240.26 |
| 2012/0099656 A1* | 4/2012 | Ohya | H04N 21/234327 375/240.23 |
| 2013/0077641 A1* | 3/2013 | Burger, Jr. | G08C 17/02 370/474 |
| 2013/0329633 A1 | 12/2013 | Dalela et al. | |
| 2014/0098679 A1* | 4/2014 | Baillargeon | H04L 43/08 370/251 |
| 2014/0185672 A1* | 7/2014 | Terada | H04N 19/11 375/240.12 |

OTHER PUBLICATIONS

Sizer, Tod, "Optical Wireless Convergence", Broadband and Wireless Access Network Research, Bell Laboratories, Feb. 25, 2008, pp. 1-13, Alcatel-Lucent, San Diego, CA.

Cooklev, Todor, et al. "The VITA 49 Analog RF-Digital Interface", IEEE Circuits and Systems Magazine, Jan. 1, 2012, pp. 21-32, vol. 12, No. 4, IEEE Service Center, New York, NY.

Cooklev, Todor, et al. "An Open RF-Digital Interface for Software-Defined Radios", IEEE Micro, Nov. 1, 2013, pp. 47-55, vol. 33, No. 6, IEEE Computer Society, Los Alamitos, CA.

Balakrishnan, Mahesh, et al. "Maelstrom: Transparent Error Correction for Communication Between Data Centers", IEEE/ACM Transactions on Networking, Jun. 1, 2011, pp. 617-629, vol. 19, No. 3, IEEE, New York, NY.

Invitation to Pay Additional Fees with Results of the Partial International Search for PCT/US2015/014287, issued by the European Patent Office, mailed on Apr. 24, 2015 in 9 pages.

* cited by examiner

PACKETIZED RADIO FREQUENCY TRANSPORT SYSTEM

CROSS-REFERENCE TO RELATED APPLICATIONS

This application claims the benefit of priority under 35 U.S.C. §119(e) of U.S. Provisional Patent Application No. 61/945,652, filed Feb. 27, 2014, entitled "Packetized Radio Frequency Transport System." The disclosure of the above-referenced application is incorporated herein by reference.

BACKGROUND

Field of the Invention

The present invention relates to signal transportation, and more specifically, to radio frequency signal transport.

Background

To keep pace with increasing Internet traffic, network operators have widely deployed optical fibers and optical transmission equipment, which substantially increases the capacity of backbone networks. A corresponding increase in access network capacity is also needed to meet the increasing bandwidth demand of end users, including Internet protocol (IP) video, high-speed data, and packet voice. Even with broadband solutions, such as digital subscriber line (DSL) and cable modem, the limited bandwidth offered by current access networks presents a bottleneck in delivering large bandwidth to end users.

SUMMARY

The present invention provides for deterministically and faithfully transporting multi-band RF spectrum over a digital network that minimizes network bandwidth.

In one implementation, a spectral network device is disclosed. The device includes: at least one of a transmitter and a receiver; the transmitter including: a down sampler configured to convert message data between analog and digital domains and extract at least one smaller bandwidth channel from a larger bandwidth channel; a packet encoder configured to implement and manage at least one spectral channel and encapsulate the message data; the receiver including: a packet decoder configured to implement and manage the at least one spectral channel and reconstitute the message data; an up sampler configured to convert the message data between digital and analog domains and insert the at least one smaller bandwidth channel into the larger bandwidth channel.

In another implementation, an apparatus is disclosed. The apparatus includes: means for transporting multi-band RF spectrum over a digital network including: means for converting radio frequency signal into internet protocol packets; means for time stamping and preserving timing for the converted radio frequency signal; and means for transporting the radio frequency signal using a radio transport standard.

Other features and advantages of the present invention will become more readily apparent to those of ordinary skill in the art after reviewing the following detailed description and accompanying drawings.

DETAILED DESCRIPTION

Figure 1:
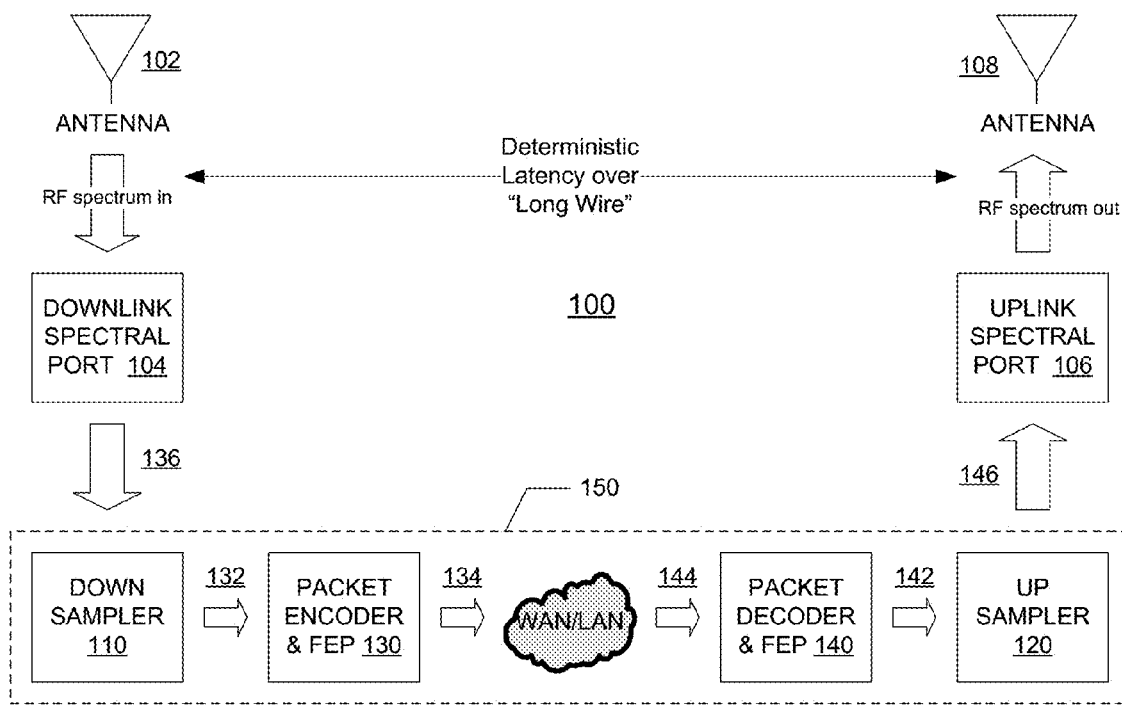
FIG. 1 is a functional block diagram of a spectral network system (e.g., SpectralNet™) configured to "deterministically and faithfully" transport multi-band RF spectrum over a digital network in accordance with one embodiment of the present disclosure.

As described above, the limited bandwidth offered by current access networks presents a bottleneck in delivering large bandwidth to end users. Accordingly, what is needed is a way to provide design and implementation of a transport mechanism that is deterministic in time and accurately retains all signal characteristics for sending multi-band RF spectrum over a digital network.

Certain implementations as described herein provide for deterministically and faithfully transporting multi-band RF spectrum over a digital network that minimizes network bandwidth. After reading this description it will become apparent how to implement the invention in various implementations and applications. Although various implementations of the present invention will be described herein, it is understood that these implementations are presented by way of example only, and not limitation. As such, this detailed description of various implementations should not be construed to limit the scope or breadth of the present invention.

In one embodiment, a spectral network system that is deterministic in time and accurately retains all signal characteristics for sending multi-band RF spectrum over a digital network is described herein. The spectral network system connects the Radio Frequency (RF) world directly with the Internet Protocol (IP) world using: (1) Digital conversion: IF to IP packets; (2) High fidelity time-stamping and preservation of signal timing; and (3) Low, deterministic latency across the network. The spectral network system moves data with assurance such as: (1) Transport via command data formats of American National Standards Institute (ANSI) VITA-49 or Special Data Dissemination Standard (SDDS); (2) Makes the unreliable WAN act like a "long wire"; (3) Agnostic to modulation type, coding, framing, encryption, TRANSEC, RF band; (4) Automatic failover using multiple devices provides continuous data; and (5) seamless switching of data streams between different antenna and modem equipment to support antenna and processing site diversity while avoiding data loss. The spectral network system also supports both analog and digital processing such as: (1) IP to analog conversion for legacy modems or spectrum analysis; (2) Feeds digital or software modems without analog conversion; and (3) Enables splitting/recombining/moving of spectrum between different sources, destinations and frequencies.

The key concepts of the spectral network system include: (1) transport of digitized RF or IF analog signals over Ethernet or Synchronous Optical Networking (SONET)/Synchronous Digital Hierarchy (SDH) networks; (2) Programmable, constant end-to-end latency overcoming network delay variation; (3) Bidirectional spectral channels to select some slice of the RF spectrum (down samplers reduce bandwidth, while up samplers increase bandwidth); (4) Packaging of digitized analog data into industry standard formats (e.g., ANSI VITA-49 or SDDS); (5) Reliable transport over impaired networks (e.g., Packet Forward Error Correction (PFEC), Reliable UDP (Intelligent Reliable Protocol—IRP), Network diversity); (6) Automatic failover between a set of devices to insure data flow; and (7) seamless switching of signals between multiple sources/sinks enabling analog data flow changes without data loss over the network.

The need for PFEC includes: (1) IP Networks lose data an entire packet at a time; (2) Traditional bit-based forward error correction techniques (e.g. Reed-Solomon) are ineffective when applied to the payload of an IP packet (e.g., cannot repair the lengthy "burst" of lost bits when the packet is lost); (3) Some IP protocols use retransmission to repair lost packets (i.e., TCP uses positive and negative acknowledgement to detect packet loss; Pragmatic General Multicast (PGM) uses negative acknowledgement); and (4) Retransmission not sufficient for transferring mission critical data over IP WAN's with sub-optimal characteristics (e.g., Long latency, Frequent packet loss, Constrained bandwidth). However, retransmission implications include: (1) Mission critical data requires deterministic latency and a continuous data flow (and no bit errors); (2) On lossy, long latency networks the NAK/Repair cycle is unpredictable; (3) Buffering becomes huge to accommodate worst case NAK/Repair cycle; (4) High packet loss leads to many repair attempts and NAK implosion; and (5) Even minimal packet loss can trigger NAK implosion if operating near peak capacity. Packet-Based Forward Error Correction (P-FEC) enables lossless, deterministic and continuous data flow over extremely impaired networks. For example, (1) No retransmission required; (2) Ideal for long latency, lossy networks; (3) Uses a simple, fast scheme to add data protection; (4) Capable of multi-gigabit rates; (5) Intended to be used with point-to-point UDP or Multicast delivery methods; (6) Configuration parameters allow P-FEC to be tuned to overcome network impairments while minimizing required overhead and latency; (7) Designed to overcome burst losses or single packets; (8) P-FEC is currently in use supporting critical national programs; and (9) P-FEC has been operationally proven to enable lossless transmission of data over a link with 1% packet loss.

FIG. 1 is a functional block diagram of a spectral network system 100 (e.g., SpectralNet™) configured to "deterministically and faithfully" transport multi-band RF spectrum over a digital network in accordance with one embodiment of the present disclosure. The spectral network system 100 is designed to transport RF spectrum over digital networks such as Ethernet or SONET/SDH, which are standardized protocols that transfer multiple digital bit streams synchronously over optical fiber using lasers or highly coherent light from light-emitting diodes (LEDs).

In the illustrated embodiment FIG. 1, the system 100 includes a downlink antenna 102, a downlink spectral port 104, a spectral channel source 136, a down sampler 110, a packet encoder and forward error protection unit 130, a packet decoder and forward error protection unit 140, an up sampler 120, a spectral channel sink 146, an uplink spectral port 106, and an uplink antenna 108. The downlink antenna 102 receives and transmits an input RF spectrum to the downlink spectral port. The uplink antenna 108 receives an output RF spectrum and transmits the signal.

A spectral port is an analog form of a frequency slot in the RF spectrum for some period of time. Terms used with the spectral port include frequency range, center frequency, maximum bandwidth, direction (uplink or in versus downlink or out), start/stop time, power level, impedance, connector style, and identifier. In one example, the RF spectrum processed by the spectral network system 100 includes radio waves spanning VHF (30 MHz) to Ka Band (40 GHz) used to carry information. For example, VHF, L, S, C, Ku and Ka bands are most popular for satellite communications (SATCOM) and Telemetry Tracking and Control (TT&C).

The spectral channels 132, 142 are digitized representations of a slice of the RF spectrum characterized primarily by a center frequency and a bandwidth. Thus, the spectral channels 132, 142 are configured to be a "deterministic and faithful" transport of a multi-band RF spectrum over a digital network that minimizes network bandwidth. By providing a real-time RF spectrum relay over ground network cables, the spectral network system 100 enables options for distributing processing functions across any network that contain both digital and RF spectrum equipment. For example, the spectral network system 100 creates the possibility for the relocation and/or substantial reduction (e.g., by virtualization) of the majority of analog related instrumentation used for satellite, airborne or other aerospace platform communications. The spectral network system's ability to preserve precision timing over non-deterministic IP networks also enables rapid, seamless antenna and modem switching, improving site diversity performance and enabling use of lower-cost terminal equipment.

A spectral network device 150 is a path between the spectral channel source 136 and the spectral channel sink 146 used to transport digitized spectrum. For example, a spectral channel source can feed 0, 1 or N circuits, but a spectral channel sink can only accept data from 0 or 1 circuits.

A spectral channel (e.g., 132, 142) can be subdivided into smaller channels. For example, a down sampler 110 extracts a smaller bandwidth channel from a larger bandwidth channel. An up sampler 120 inserts a smaller bandwidth channel into a larger bandwidth channel. The down sampler 110 and the up sampler 120 are configured for conversion between the analog and digital domains.

The system 100 also includes a packet encoder 130 and a packet decoder 140 for implementing and managing a number of spectral channels 132, 142 using Packet Forward Error Correction (P-FEC) techniques, and for encapsulation/decapsulation 134, 144 of the data (e.g., using ANSI VITA-49 or SDDS message formats). These elements are described below in detail.

Digitizer Function and Down Sampler

As shown in FIG. 1, the RF spectrum enters the spectral network system 100 through the Downlink Spectral Port 104 and is the analog form of a frequency slice in the RF spectrum that is present for some period of time. As stated above, the characteristics of a spectral port include frequency range, center frequency, maximum bandwidth, direction (downlink/in versus uplink/out), start/stop time, power level, impedance, connector style and an identifier. The down sampler 110 creates some number of spectral channels which capture only a portion of the total bandwidth of the downlink spectral port.

Figure 2:
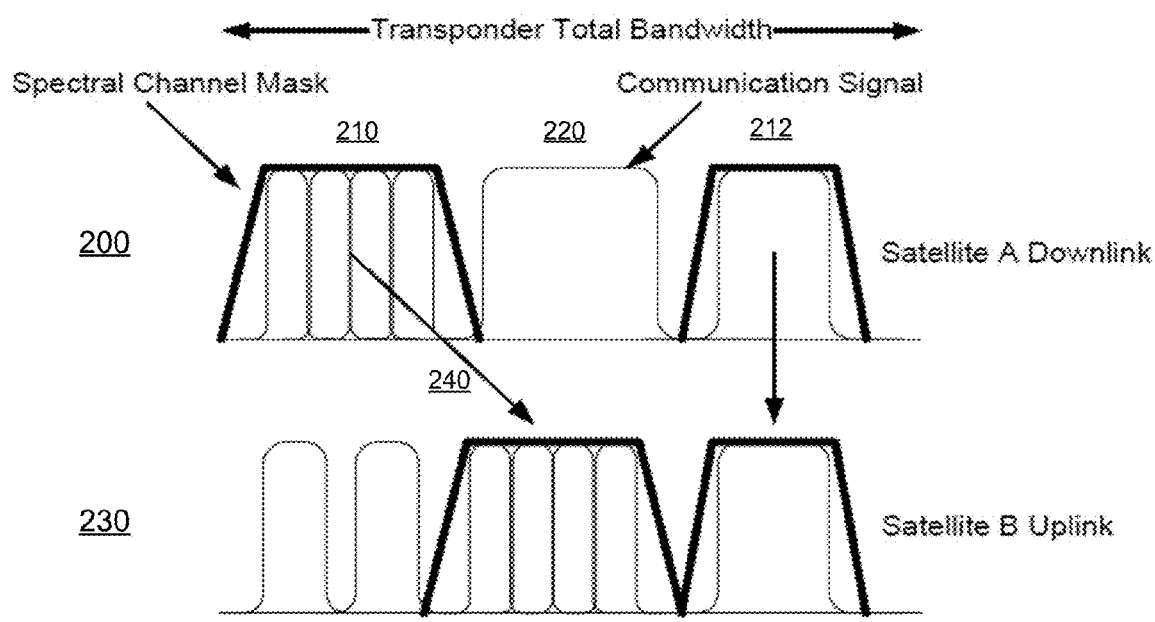
FIG. 2 shows a satellite downlink which includes one spectral channel that handles a group of four narrowband communication signals and a second channel that encompasses a single wideband carrier.

FIG. 2 shows a satellite downlink 200 which includes one spectral channel 210 that handles a group of four narrowband communication signals and a second channel 212 that encompasses a single wideband carrier. The center frequency and bandwidth of each spectral channel is tunable to allow precise matching of the digitized bandwidth to the carrier or carrier group to minimize the required network bandwidth. In this example, there is no current user for the middle carrier 220 so instead of transporting the entire transponder bandwidth, significant network bandwidth is saved by only transporting the two spectrum segments of interest 210/212.

Message Encapsulation and Packet Encoder

The packet encoder 130 (see FIG. 1) packages the spectral channel outputs into one of two formats. The complex Cartesian samples (i.e., in-phase, or I, and quadrature, or Q, components) created by a spectral channel can be formatted using the ANSI/VITA-49 Radio Transport (VRT) Standard or the SDDS. When using VRT intermediate frequency (IF) data packets, the I and Q samples use the "link-efficient" method, where samples are inserted into the payload with unused bits between them, to minimize the network bandwidth. Each sample is a fixed-point, signed number but the number of bits per sample is adjustable based on the signal-to-noise ratio required by the processing equipment at the remote destination. Network transport cost can be minimized by reducing the number of bits per sample since it leads to a corresponding reduction in network bandwidth. Metadata describing the spectral channel settings and status are conveyed in VRT IF context packets and includes a timestamp, center frequency, bandwidth, sample rate, data payload format (including bits/sample), analog-to-digital converter reference level (dBm), gain and RF center frequency. The IF context packets are typically sent only when the metadata changes to minimize the network bandwidth.

In contrast, the SDDS format conveys both samples and metadata in the same message.

Figure 3:
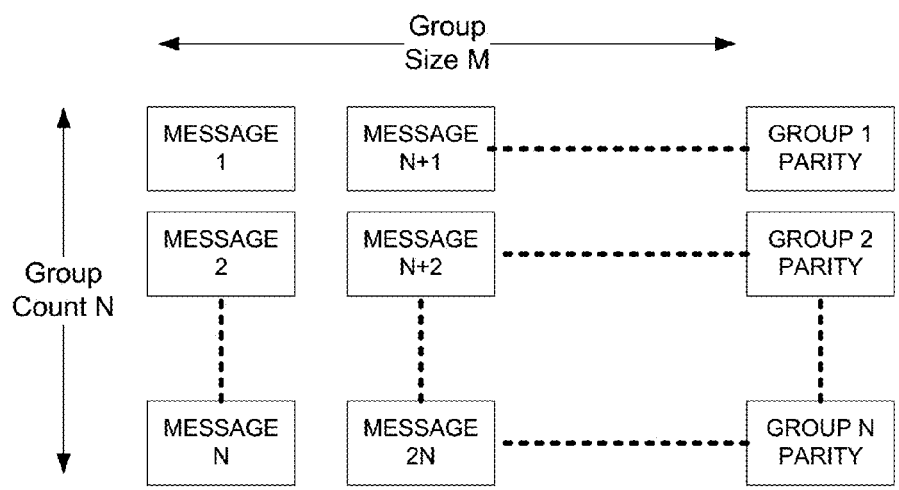
FIG. 3 shows inbound messages organized into N groups of M messages for each group.

The packet encoder 130 adds forward error correction to the information stream by arranging the data into interleaved parity groups as shown in FIG. 3. FIG. 3 shows inbound messages organized into N groups of M messages for each group. The packet encoder 130 generates a parity block for each group (a row in FIG. 3) by exclusive OR'ing all the messages together for a particular row. By interleaving the messages, the stream can experience losses of N contiguous network packets and still produce error-free data at the destination. The advantage of using the P-FEC over other reliable protocols like TCP, PGM or NORM is the elimination of any back channel traffic for acknowledgements or repair requests. This feature not only makes it ideal for simplex networks but reduces end-to-end latency since data is not held up waiting for repair packets. The parity packets add overhead to the information stream (1/M) but M is configurable and can be set to comply with network bandwidth allocations.

The original messages and parity packets are then transmitted through the appropriate network port to a Local Area Network (LAN) or Wide Area Network (WAN). The network ports can be configured as either 1 Gb/10 Gb Ethernet or SONET/SDH connections. Each spectral channel is matched to a network port based on the capacity of the network connection and the intended destination. FIG. 1 shows the spectral network device 150 as the destination but that is only the case when the processing equipment at the destination has analog signal interfaces. However, network packets could be sent directly to a modem with a network input or to a software modem running on commodity rack or blade servers.

Packet Decoder and Message Decapsulation

The packet decoder 140 reconstitutes or decapsulates the original messages received on the network port by using the parity packet for each group to create a packet missing from that group. If more than one message is lost within the group, then the missing messages cannot be restored and the parity packet is sent in its place to maintain packet timing. Packet correction contributes a maximum of M×N packets of delay to the end-to-end latency to wait for the parity packets to arrive. However, this is typically small when compared to the LAN/WAN delays, since the packet rates are high when transporting sampled analog signals. Real-time information streams using protocols that require the transmission of repair packets experience at least the Round Trip Time (RTT) for their end-to-end latency whereas P-FEC will only incur half the RTT plus the small M×N delay.

The VRT or SDDS messages coming out of the P-FEC process are disassembled in the second stage of the Packet Decoder. The metadata (e.g., center frequency, bandwidth, sample rate, bits/sample, etc.) is used to provision the uplink spectral channel to match the source. The I/Q samples are then removed from the VRT or SDDS message and fed into the spectral channel at the same rate they were generated by the source.

Up Sampler and Signal Reconstruction

The spectral channel on the uplink side operates substantially similarly to the down sampler, but in reverse. All spectral channels can be configured to act as either a down sampler or an up sampler, since there are cases where the number of downlinks handled by a spectral network device is not the same as the number of uplinks in the same device. Each up sampler 120 creates some number of spectral channels which capture only a portion of the total bandwidth of the uplink spectral port 106. The up sampled signals can be assigned a different center frequency than it had when it arrived at the source before the conversion to the analog domain. This mechanism provides a flexible way to map communication signals to specific transponders.

FIG. 2 shows a group of four carriers 210 on the Satellite A's downlink 200 being shifted 240 to a higher center frequency on Satellite B's uplink 230. Up sampled signals can also be replicated and converted into the analog domain as multiple copies. This provides a mechanism for broadcasting the spectrum to multiple sources or duplicating portions of the spectrum in a selective yet strategic fashion.

The outputs of all spectral channels are summed and converted to the analog domain and sent out through the uplink spectral port 106. The uplink port 106 shares the same characteristics as the downlink port 104 (viz., frequency range, center frequency, max bandwidth, start/stop time, power level, impedance, connector style and an identifier) and feeds the analog signal into antenna up converters, modems with analog inputs or simulation and test equipment for signal generation or monitoring.

Latency Control

Satellite system operators have to account for space-to-ground and ground-to-space link transit times which need to be deterministic and typically low (under a second). Satellite ranging operations demand delays to hold constant to within a few nanoseconds. Time Division Multiple Access (TMDA) schemes need very low ground equipment delays, since the round trip time through the satellite is already close to a half a second. System operators allocate some portion of the overall timing budget to each segment of the link (e.g., modulator, up converter, free-space propagation, demodulator, transport, processing, etc.). Networks do not produce the same delay for each packet resulting in time of arrival (TOA) jitter. SONET/SDH networks have much lower TOA jitter compared to Ethernet networks but neither one has low enough TOA jitter for transporting packetized RF. The spectral network devices provide a configurable, fixed end-to-end latency in order to overcome the TOA jitter in the network. The delay contribution due to the source or sink spectral network device is a small percentage of the overall delay. Each device requires global frequency and time references in order to meet the latency demands of satellite systems. The global frequency reference (typically a 10 MHz sine wave from a GPS receiver) guarantees that all analog-to-digital converters, digital-to-analog converters, and spectral channels run at the same sampling rates. The time of creation (TOC) timestamps included in the VRT or SDDS packets are derived from the global time reference at the source device. The destination device compares each TOC timestamp to its current time, which is slaved to the global time reference, and only releases the data to the spectral channel when the end-to-end latency target has been achieved. The delay through the spectral channel and conversion devices is fixed and known a priori.

Automatic Failover

The Automatic Failover function built into each spectral network device 150 can provide reliability numbers approaching five-9's. In computing, a failover is switching to a redundant or standby computer server, system, hardware component or network upon the failure or abnormal termination of the previously active application, server, system, hardware component, or network.

Figure 4:
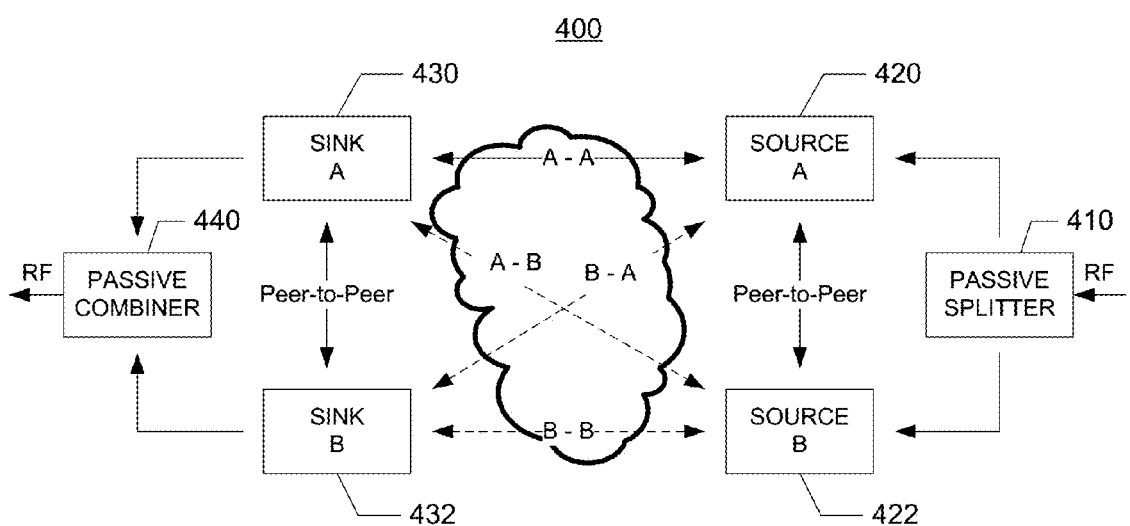
FIG. 4 shows the appliance-level automatic failover arrangement in accordance with one embodiment of the present disclosure.

FIG. 4 shows the appliance-level automatic failover arrangement 400 in accordance with one embodiment of the present disclosure. In the illustrated embodiment of FIG. 4, the automatic failover arrangement 400 includes a passive splitter 410, Sources A 420 and B 422, Sinks A 430 and B 432, and a passive combiner 440. The passive splitter 410 is configured to receive an RF source signal, passively split the RF signal, and feed the signals into Source A 420 and Source B 422. At the destination, there are two sink devices, Sink A 430 and Sink B 432, but only one of them at a time drives a signal into the passive combiner 440 to produce an RF sink signal. Even though the source and sink devices operate at the same clock rates, the small phase difference between the units would create unwanted inter-symbol interference if the reconstructed analog signals were summed together. The Automatic Failover function can operate with or without network diversity.

The fastest failover times occur when using network diversity. In this mode, Source A 420 feeds a network stream to Sink A 430 and at the same time Source B 422 feeds its network stream to Sink B 432. The two sinks 430, 432 communicate over the local peer-to-peer network connection to decide who will act as a primary (non-squelched) unit. The backup unit continues to process the incoming network stream but squelches its analog output so that is does not interfere with the primary unit's output signal. The backup unit is constantly monitoring the primary unit to make sure it is alive and is still receiving a network stream. If the backup unit does not receive a response from the primary unit after a number of attempts or the primary unit informs the backup unit that it is no longer receiving a network stream, then the backup unit takes on the role of a primary unit and un-squelches its analog output. Failover can be accomplished very quickly (i.e., <1 msec) since the decision is not impacted by network delays. This method requires two copies of the digitized RF data in the network all the time. The network bandwidth requirements can be cut in half at the expense of increased failover times by not using the network diversity.

When the Automatic Failover function operates without network diversity, only one of the two paths shown in FIG. 4 will be active at any one time. The two sinks 430, 432 carry on the same conversation as they did when network diversity was being used, but now the two sources 420, 422 have a similar conversation. They use their peer-to-peer connection to decide who plays the role of a primary unit, since only the primary unit can output data to the network. In this mode, there is an additional message from each sink 430, 432 to its respective source 420, 422 informing it of its presence. For example, assuming Source A 420 is currently acting as the primary unit, but it no longer receives messages from Sink A 430, Source A then informs Source B 422 to take over the role of a primary unit. Failover takes longer in this mode, since it will take at least half the RTT of the network before Sink B 432 can start producing an RF signal.

The appliance-level automatic failover function can be summarized as follows: (1) Devices communicate with local and remote peers to decide who sends and receives data; (2) Input RF signal is split and sent to both source-side devices (source devices are not sample-synchronous with each other); (3) Only one sink-side device generates an IF signal (sink devices are not sample-synchronous with each other); and (4) Small data loss (<1 msec) when failover occurs.

Seamless Diversity Switching

The automatic failover processing is also enhanced to provide seamless data switching between diverse paths. This capability enables the spectral channel information flowing between a modem and an antenna, for example, to be switched to a different antenna without loss of data on the link, even when the path lengths between the modem and the two antennas are different. This is accomplished by means of an adaptive correlation function within the spectral channel processing. The adaptive correlation function computes an estimate of the path-delay difference between the two sites by cross-correlating the signals from the two different spectral channels. The cross-correlation response generates a real-time estimate of the path difference, which is used by the latency control function to resample and offset the data streams so that the signals arrive at the processing or transmit destination at the substantially identical time. Because the signals are aligned in time, the signal stream may then be switched to overcome the effects of system outage, weather degradation (rain fade), or adverse signal environment such as jamming or interference at a location.

A site diversity is a capability where an overall communication system can be implemented in a way that renders it robust to local impairments by providing multiple transmit, receive, and/or processing locations. The most common need for site diversity is in Ku and Ka-Band communication systems, which are highly susceptible to weather-induced signal fade caused by rain. The traditional solutions to the rain fade problem include provisioning large, high-power antenna sites that provide enough link margin to "punch through" the weather degradation; and to accept periods of signal outage while processing is moved from one antenna to a backup antenna when the weather is severe. Other uses for site diversity include the need to overcome localized signal interference (either intentional jamming or inadvertent co-site signal interference), or mechanical problems at the antenna site.

Figure 5:
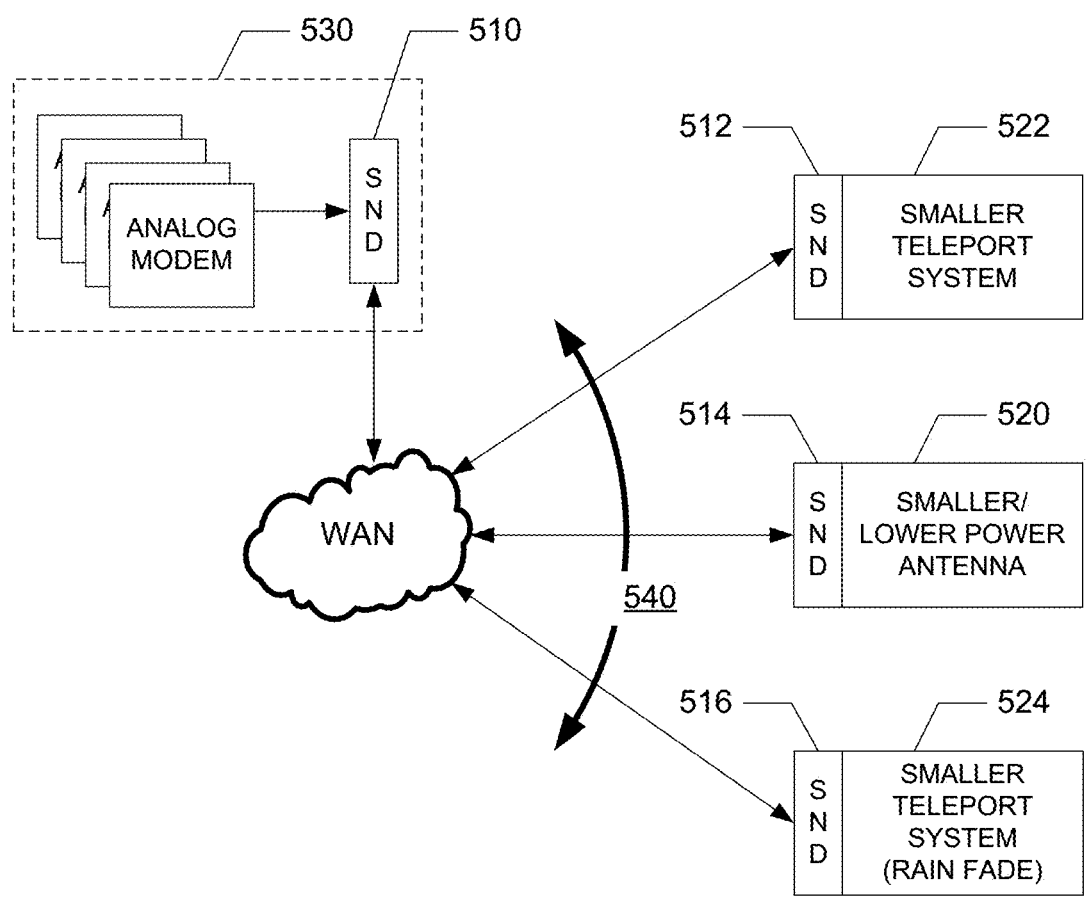
FIG. 5 shows the ability of a spectral network device (SND) to perform precision time offset computation and latency control, in concert with its ability to rapidly switch between data sources, which enables the communication system to implement seamless site diversity.

FIG. 5 shows the ability of a spectral network device (SND) to perform precision time offset computation and latency control, in concert with its ability to rapidly switch between data sources, which enables the communication system to implement seamless site diversity. In the illustrated embodiment of FIG. 5, the spectral network devices 510, 512, 514, 516 allow users to replace a large/high power antenna and feed with smaller/lower power antenna systems 520, and/or add diversely located smaller teleport systems 522, 524 to the ground network 530 at much lower cost relative to their current larger Ka/Ku-Band teleport systems. Using spectral network devices 510, 512, 514, 516, the downlink signals from the diversely located/lower power antenna feeds can be switched in real time and forwarded to downstream equipment. This "best-source" signal from the diverse signal sources is transparent to downstream modem equipment where the switchover (due to detected rain fade or failover) 540 from one signal source to another occurs quickly enough to avoid loss of signal lock or carrier re-acquisition from occurring in the modems. Accordingly, the spectral network system enables Ku-Band or Ka-Band antenna sites to solve the problematic issue of data loss due to atmospheric signal rain-fade, or equipment degradation for antenna sites in general. Thus, each issues is solved in a manner that reduces overall equipment costs, mitigates data loss and increases the availability/quality of service (QoS) of the satellite accesses using these antenna sites.

Use Case—Virtual Teleport

Figure 6A:
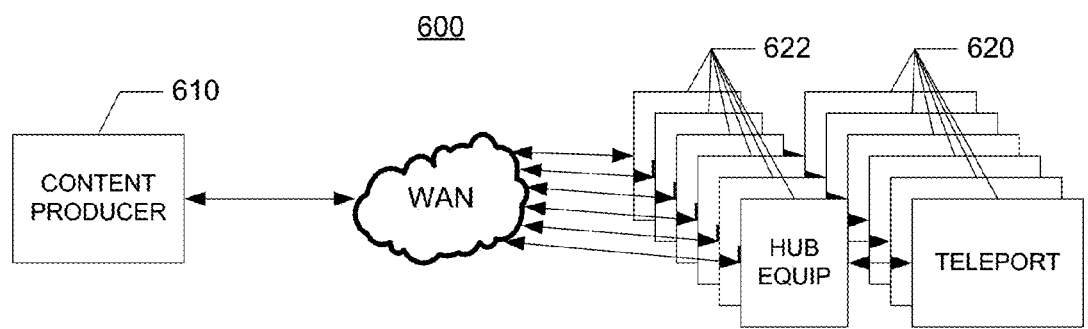
FIG. 6A shows a system in which a content producer needs to send data to multiple teleports to reach all of the customers.

FIG. 6A shows a system 600 in which a content producer 610 needs to send data to multiple teleports 620 to reach all of the customers. In the illustrated embodiment of FIG. 6A, the hub 622 equipment installed at each teleport 620 is expensive, uses significant rack space, and requires maintenance personnel at each teleport.

Figure 6B:
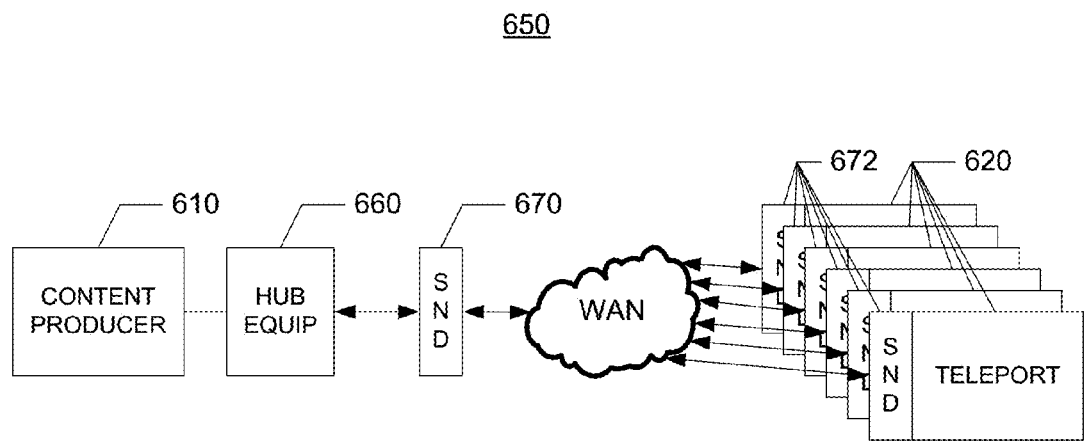
FIG. 6B shows a system in which spectral network devices are used to reduce the need for expensive teleport hub equipment and associated logistics/manning at earth stations.

In contrast, FIG. 6B shows a system 650 in which spectral network devices 670, 672 are used to reduce the need for expensive teleport hub equipment 622 and associated logistics/manning at earth stations. In the illustrated embodiment of FIG. 6B, the content producer 610 maintains a single copy of the expensive hub equipment 660 in its facility and use the network to route the spectral channel data to one or more teleports 620.

Use Case—Remote Site Simplification

Figure 7A:
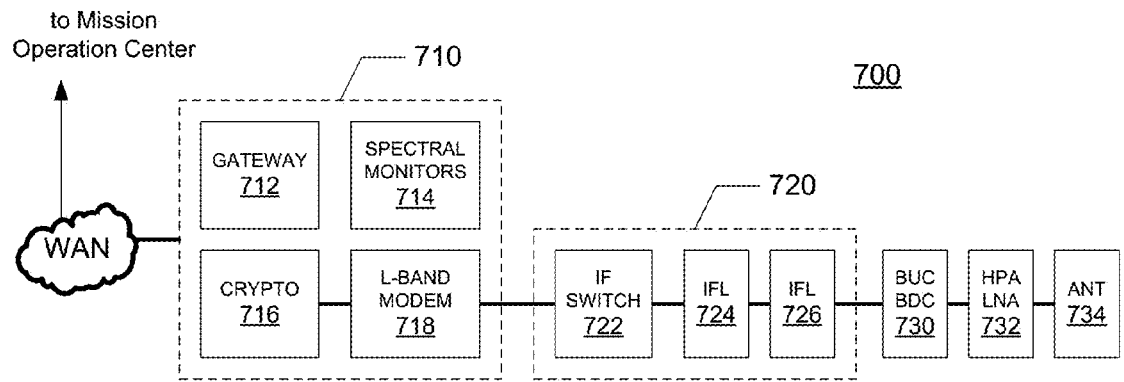
FIG. 7A shows conventional configuration of a remote ground station.

FIG. 7A shows conventional configuration of a remote ground station 700. As shown in FIG. 7A, the conventional remote ground station 700 must process the RF signal on location and send the demodulated data stream through the wide area network (WAN) to the mission operation center. The on-site processing equipment 720 includes RF-to-optical inter-facility links (IFL) 724, 726 to connect block up/down converters (BUC/BDC) 730 through IF switches 722 to the modem 718 and spectral monitors 714. There may also be cryptographic devices 716 and gateways 712 to convert encrypt/decrypt modem serial signals and transport them over the WAN. The remote site 700 also includes amplifiers (HPA/LNA) 732 and antenna 734.

Figure 7B:
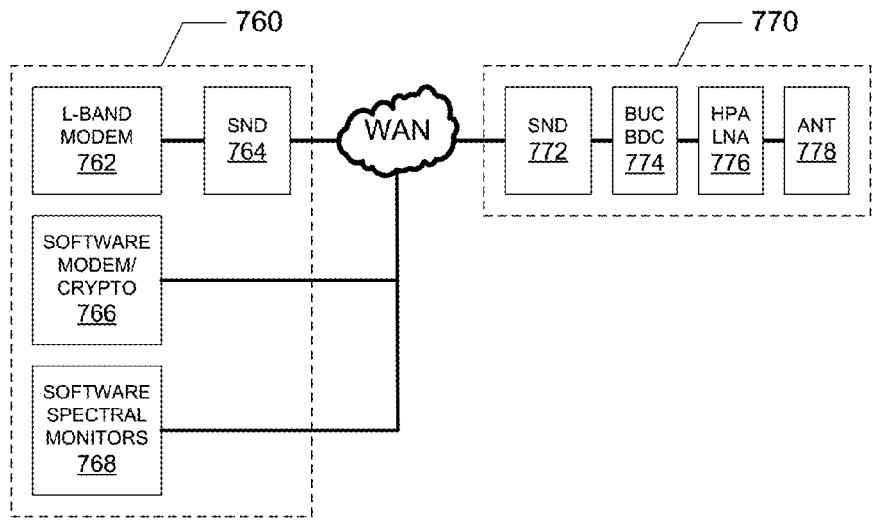
FIG. 7B shows a simplified remote ground station in communication with a mission operation center configured with spectral network devices in accordance with one embodiment of the present disclosure.

FIG. 7B shows a simplified remote ground station 770 in communication with a mission operation center 760 configured with spectral network devices 764, 772 in accordance with one embodiment of the present disclosure. The RF-to-optical IFLs have a large bandwidth but have a low dynamic range and limit the maximum separation between the up/down converters and the IF switch. The conversion devices in the spectral network devices 764, 772 provide higher dynamic range and the maximum separation is essentially unlimited. In the illustrated embodiment of FIG. 7B, the IF switches and gateways are no longer needed and the modem 762, the cryptos 766, and the spectral monitors 768 can be moved to the mission operation center 760. Accordingly, the resulting configuration shown in FIG. 7B has much lower capital and maintenance costs, as well as substantially reduce the need for secure facilities. The simplified remote ground station 770 now includes the spectral network device 772, the BUC/BDC 774, the HPA/LNA 776, and the antenna 778.

Use Case—Spectral Networking

Figure 8:
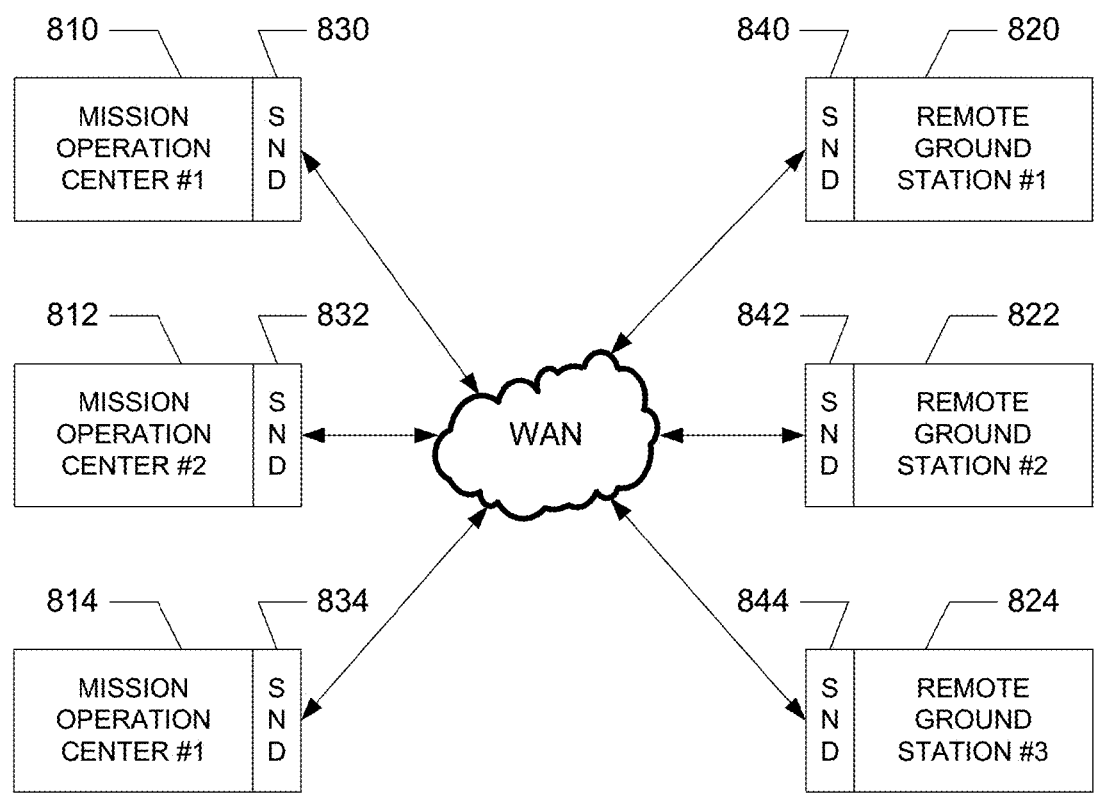
FIG. 8 shows multiple mission operation centers and multiple remote ground stations communicating over the WAN using spectral network devices.

It is common practice to have multiple mission operation centers and multiple remote ground stations. FIG. 8 shows multiple mission operation centers 810, 812, 814 and multiple remote ground stations 820, 822, 824 communicating over the WAN using spectral network devices 830, 832, 834, 840, 842, 844. The spectral network devices allow any mission center to communicate with any remote ground station over the WAN. This also allows processing equipment to be shared across multiple sites.

Use Case—SATCOM Capacity Multiplier

Figure 9:
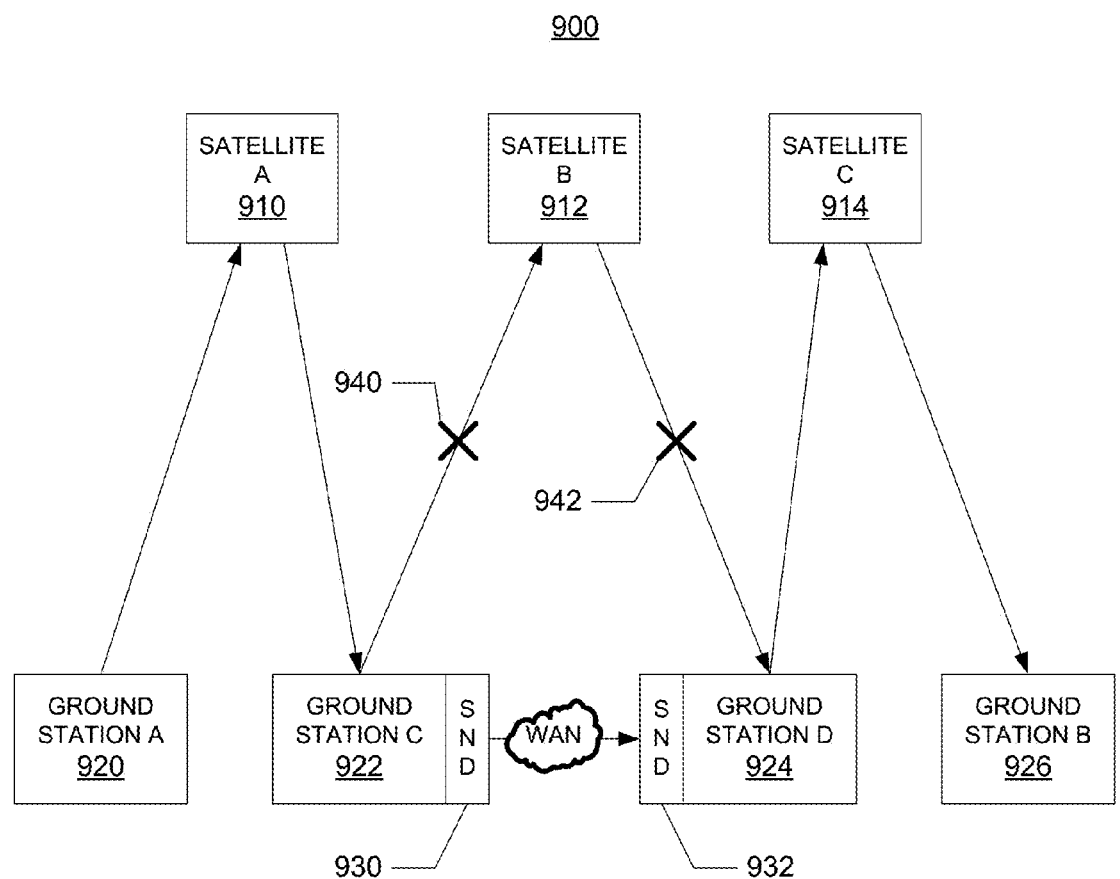
FIG. 9 shows a data network system in which data from a ground station is routed to another ground station using satellite bounces.

Satcom providers may need to hop a user's signal through a number of their satellites in order to satisfy the customer's distribution requirements. The spectral network devices can be used to eliminate a satellite hop by sending the same data through a terrestrial network. For example, FIG. 9 shows a data network system 900 in which data from a ground station is routed to another ground station using satellite bounces. Thus, in the illustrated embodiment of FIG. 9, the RF data from ground station A 920, which is intended to be routed to ground station B 926 (e.g., in another continent), is initially uploaded to satellite A 910 and bounced to ground station C 922. Normally, this data that is bounced to ground station C 922 from satellite A is routed to ground station D 924 through a satellite bounce up to satellite B 912. However, using the spectral network devices 930, 932 installed in ground stations C and D, respectively, the RF data can be routed through the terrestrial network (e.g., WAN), thereby eliminating the need for the satellite bounce 940, 942 to satellite B 912. The capacity opened up in the space asset (i.e., satellite B) can now be sold to a customer. Since the terrestrial network costs continue to decline, the margins for the additional capacity will continue to improve.

Use Case—Digital or Software Modem Enabler

Figure 10:
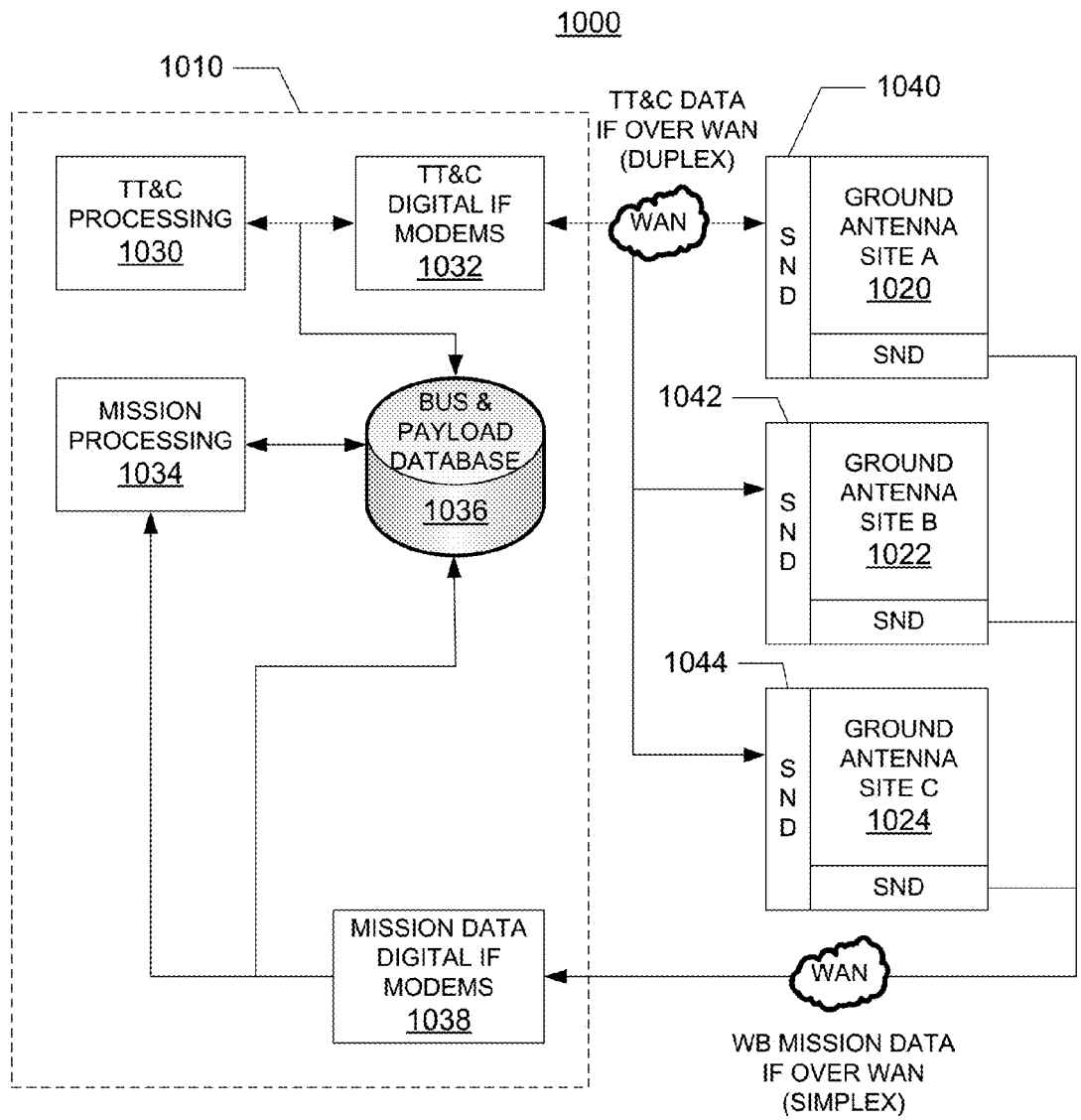
FIG. 10 is satellite ground architecture that includes two primary elements, a commodity data center and networked remote antenna sites.

FIG. 10 is satellite ground architecture 1000 that includes two primary elements: a commodity data center 1010 for the mission operations; and networked remote antenna sites 1020, 1022, 1024 handling digitized RF that can be placed in the most advantageous point within the satellite's ground footprint as long as there is access to an Internet Service Provider (ISP).

The initial deployments of the spectral network devices 1040, 1042, 1044 support legacy modems and spectrum monitoring equipment designed for analog RF or IF inputs. New modems are currently being deployed that accept network inputs using industry standard message formats (VITA-49 or SDDS). These modems come in two forms depending on the message rates they are designed to handle: (1) Mission data modems 1038 run at data rates in the 100's of Mbps to the low Gbps; (2) Telemetry, Tracking and Commanding (TT&C) modems 1032 operate on data rates in the 10's of kbps to the low Mbps (generated by TT&C processing 1030) and can be implemented as pure software functions running on multi-core rack or blade servers. The mission data modems 1038 use one or more FPGAs running parallelized signal processing algorithms to perform modulation and demodulation. The modems 1038 can accept UDP/IP network packets with the VITA-49 or SDDS messages directly into the firmware where they are disassembled. The samples are fed into signal processing components 1034 that are configured using the metadata in the spectral network messages. Both mission data and TT&C data can be stored in bus & payload database 1036.

Use Case—On-Orbit Anomaly Handling

Figure 11:
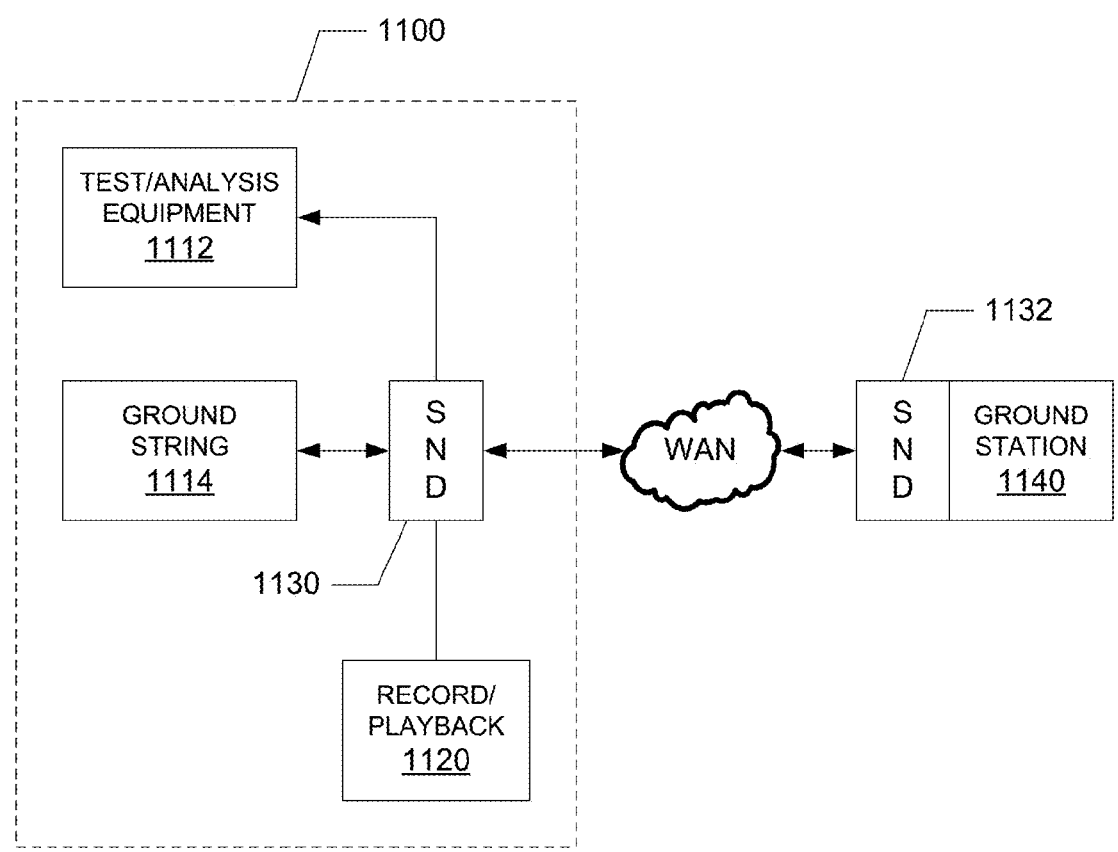
FIG. 11 shows a ground analysis facility in communication with a ground station over the WAN.

The spectral network devices can be augmented with record capability to provide a powerful tool for troubleshooting on-orbit anomalies. For example, FIG. 11 shows a ground analysis facility 1100 in communication with a ground station 1140 over the WAN. In the illustrated embodiment of FIG. 11, a recorder 1120 coupled to the spectral network device 1130 acts as a rolling 'black box' recorder and can store a few hours to a few days of spectral data (e.g., from a ground station 1140 through a spectral network device 1132) which can be queried by offline analysts using test/analysis equipment 1112 and ground string 1114 when investigating problems. Since the spectrum for an entire transponder is preserved, the recorded data can reveal system operation leading up to, during and after the event. Because the entire transponder is saved it is also possible to geo-locate signals in the near past which can be another valuable tool when resolving issues.

Intelligent Dynamic Signal Transport System (IDynSTS)

Figure 12:
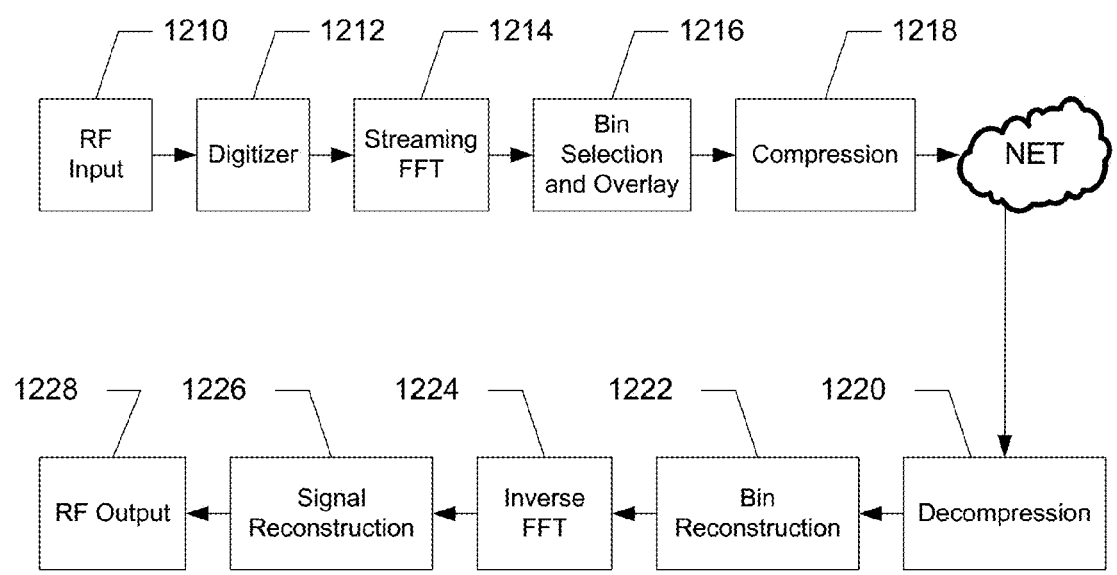
FIG. 12 is a functional block diagram of an Intelligent Dynamic Signal Transport System (IDynSTS) designed to accurately capture received radio frequency (RF) signals, such as communication signals, and transport them efficiently over digital networks such as Ethernet.

FIG. 12 is a functional block diagram of an Intelligent Dynamic Signal Transport System (IDynSTS) 1200 designed to accurately capture received radio frequency (RF) signals, such as communication signals, and transport them efficiently over digital networks such as Ethernet. In the illustrated embodiment of FIG. 12, the RF signal 1210 is received, digitized by a digitizer 1212, transformed by a streaming FFT 1214, overlaid by a bin selection and overlay 1216, and compressed by a compression unit 1218. It is then able to reconstruct the captured signals at the far end, such that the original information is available as if the user were present on the near end. For example, the signal received over the digital network is decompressed by a decompression unit 1220, reconstructed by a bin reconstruction 1222, transformed by an inverse FFT 1224, signal reconstructed by a signal reconstruction unit 1226, and produced as an RF output 1228. Thus, IDynSTS 1200 provides efficient communication of information using adaptive and dynamic methods to minimize the network bandwidth requirements. Each unit of the IDynSTS 1200 is further described below in detail.

Digitizer Function and Output Data Rate

Received signals are captured using a hardware digitizer 1212, capable of sampling the input signal environment, fully satisfying the Nyquist criterion for sampled systems. This requires that the sample rate of the digitizer be greater than twice the bandwidth $B_w$ ($f_s \geq 2B_w$). Adequate signal fidelity must be maintained for the purposes of the application, requiring that each sample be large enough to accurately represent the captured signal at the samples instant in time. For uniform sampling, the signal to noise ratio can be shown to be related to the number of bits $N_b$ by $SNR=6.02*N_b$. Currently, digitizers designed to capture RF signals typically use anywhere between 4 to 16 bits. The required digitized data rate to convey the captured information is therefore a total of $D_R = f_s * N_b > 2*B_w*N_b$. As an example, we assume that the desired bandwidth is 50 MHz, and the desired signal to noise ratio requires 8 bit samples.

$$D_R \geq 2 \cdot 50 \text{ (MHz)} \cdot 8 = 800 \text{ Mbps}$$

At this data rate and signal fidelity, the data can be packaged and transported across a standard Gigabit Ethernet network.

Streaming FFT

Figure 13:
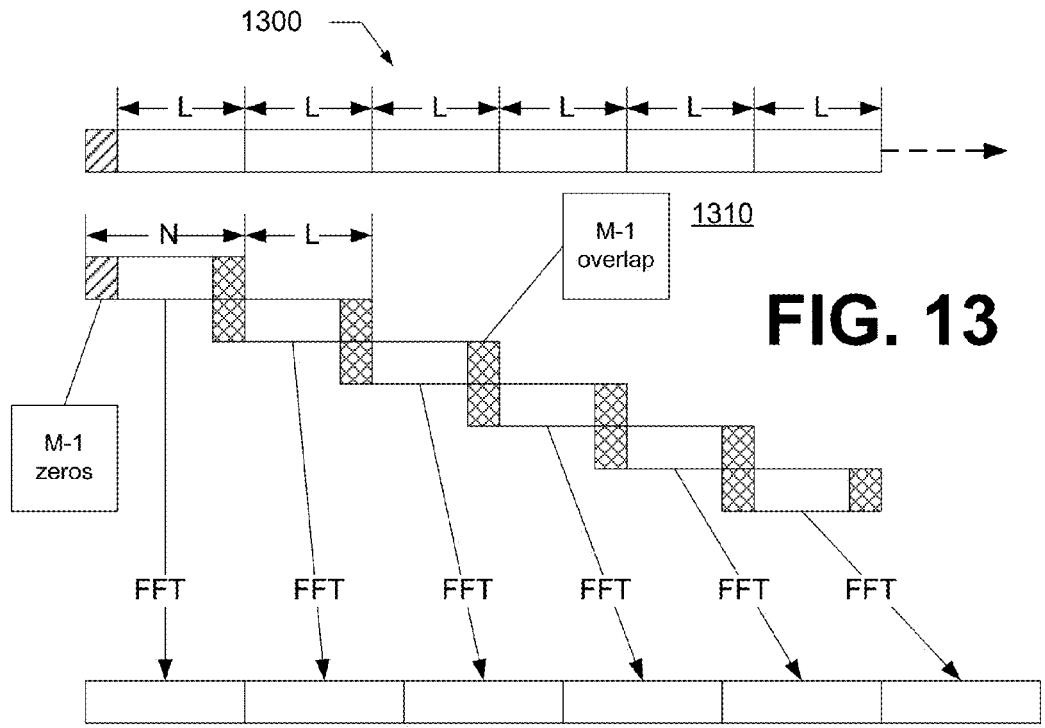
FIG. 13 shows the steps involved in the overlap-save streaming FFT implementation.

The streaming FFT function 1214 is designed to transform the sampled data values into the frequency domain while maintaining the ability to reconstruct the time contiguous signal without distortion. The process conforms to the known overlap-save or overlap-add algorithm. The steps involved in the overlap-save streaming FFT implementation are illustrated in FIG. 13. In the illustrated embodiment of FIG. 13, the input data stream is conceptually segmented into blocks of length L 1300, and overlapped by M−1 samples 1310, where L and M are chosen to satisfy processing requirements.

Bin Selection and Overlay

The purpose of the bin selection and overlay process 1216 is to eliminate frequency bins which do not have useful information, and thus are discarded from further processing. In an extreme case, if there are no signals of interest within the entire spectrum, than no data needs to be transferred.

The bin selection process 1216 is split into multiple stages, wherein each analysis stage is designed to capture signals with different characteristics. One stage is designed to capture the characteristics associated with many normal communication signals which have nearly constant power versus time characteristics. Example communication signals possessing this characteristic include PSK, FM, QAM, FSK, and OFDM. In these cases, signal isolation can be determined by simple power versus frequency analysis, which allows the frequencies which do not contain any useful information to be ignored. Another stage is designed to capture dynamic signals such as frequency or time agile signals. Examples of signals exhibiting these characteristics include Frequency Hopping Spread Spectrum (FHSS), and Time Division Multiplex (TDM) modulations. Due to the time selective nature of the signal, an overlay process is allowed, such that surrounding (in time) active bins will be selected for transmission to ensure that the desired time window is captured.

Compression

The compression function 1218 is primarily concerned with analyzing the information obtained from the bin selection and overlay process and deciding how to encode the data in a bit efficient manner. For lossless data compression, each active bin grouping is analyzed and classified according to the signal content, such as modulation type. A signal prediction process based upon the identified modulation characteristics is applied. This process can be compared as an extension to the more well-known linear predictive coding algorithm. The residuals from this encoding step are further compressed using well known entropy encoding techniques such as Rice, Arithmetic, and/or Huffman encoding. For higher compression needs, lossy compression algorithms are also implemented. The lossy algorithms are designed to limit loss of fidelity based upon metrics associated with each modulation type. As an example, for QPSK modulated signals, the process of compressing and decompressing should limit the impact on error rates. The process is similar in concept to lossy compression techniques applied to other applications such as video and audio, where each limits the impact on visual or audio perceptions. In this application, the quality of the compressed waveform is determined by increases in bit error rates for communications signals, or reductions in ability to measure time of arrival or frequency of arrival for navigation signals.

Decompression

Decompression functions 1220 are configured to restore the original data stream from the compression stage. In some cases, where adaptive coding techniques are employed in the encoding process, these functions must be recreated here to re-create the original data stream.

Bin Reconstruction

The bit reconstruction unit 1222 functions to restore the entire frequency domain representation of the input signal into a contiguous block which is compatible with the inverse FFT function.

Inverse FFT

The purpose of the inverse FFT functional unit 1224 is to convert the frequency domain signal representation into a time domain signal. This process is performed on a block basis and needs additional processing to recover the continuous time domain signal.

Signal Reconstruction

Figure 14:
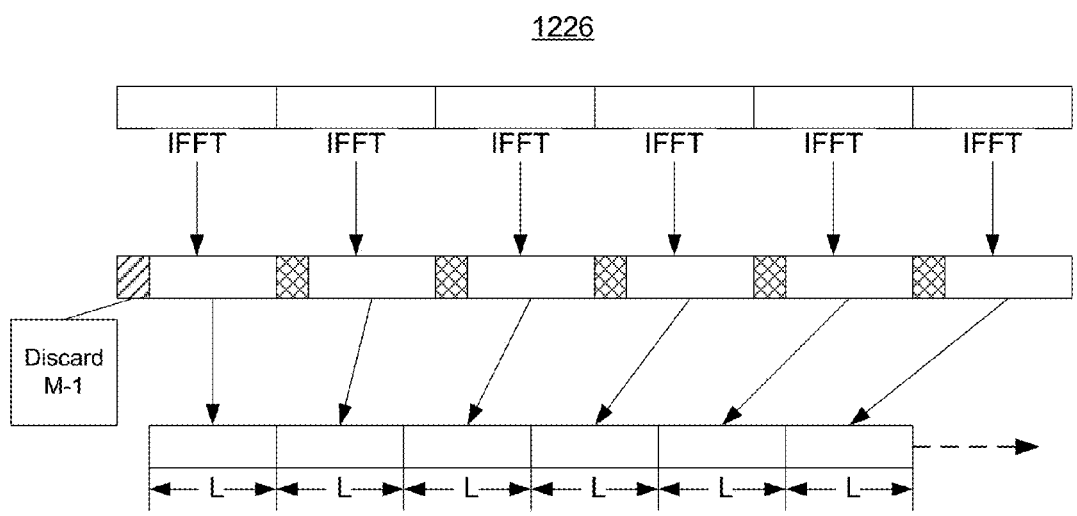
FIG. 14 shows an example of a signal reconstruction function.

The blocks of data from the inverse FFT need to be combined in a specific manner depending upon whether an overlap-save or overlap-add algorithm was utilized in the Streaming FFT function. The purpose of the signal reconstruction function 1226 is to restore the block based processing results into a time contiguous signal, which is an accurate representation of the original waveform. An example of a signal reconstruction function 1226 is shown in FIG. 14.

Optimized Sub-Band Tuner/Translator

Figure 15:
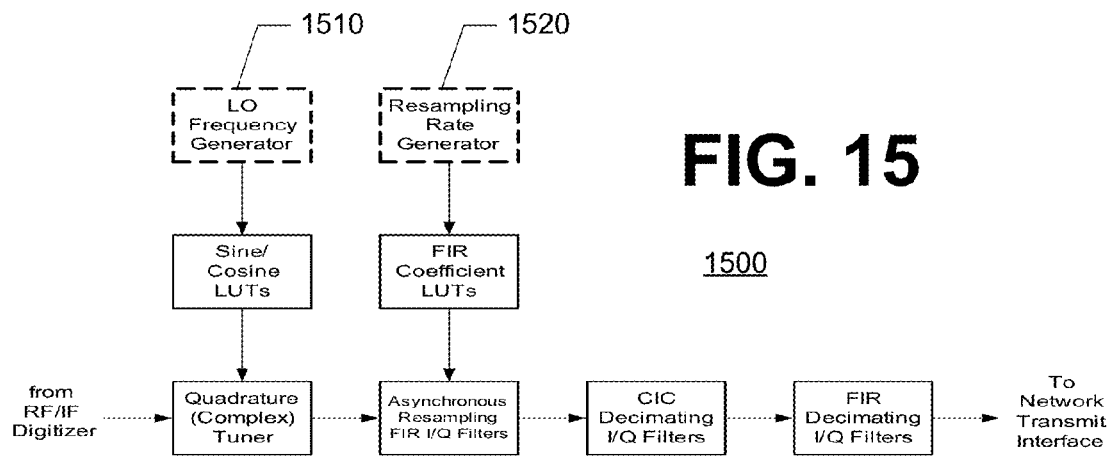
FIG. 15 is a functional block diagram of a down sampler.
Figure 16:
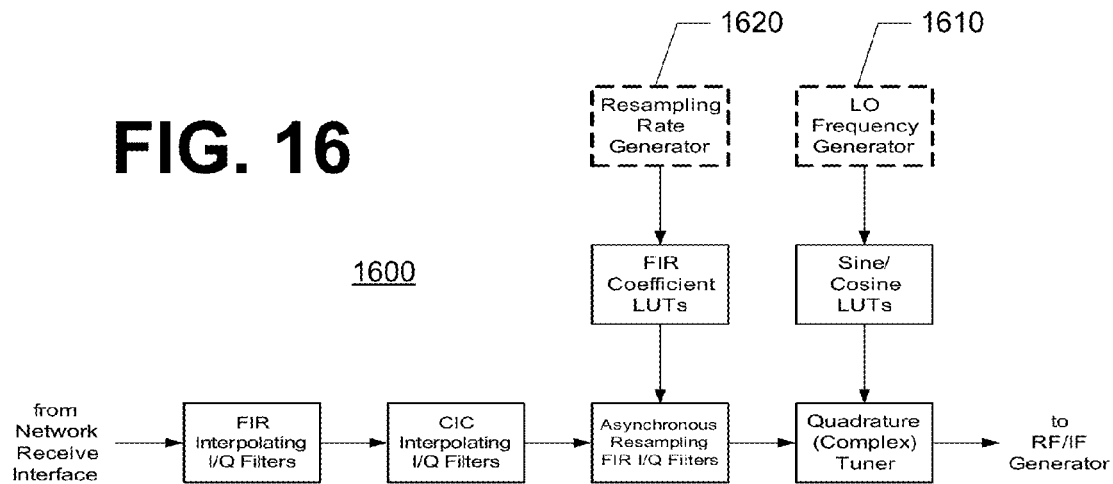
FIG. 16 is a functional block diagram of an up sampler.

The Optimized Sub-Band Tuner/Translator provides RF/IF signal down and up sampling capabilities having a wide range of bandwidth selections with high setting resolution and accuracy. This allows a user to optimally match frequency and bandwidth settings to the signal being transported, minimizing potentially expensive network bandwidth. This approach generates exact (integer ratio) high resolution frequency settings for both LO synthesis and sample rate changes. FIGS. 15 and 16 are functional block diagrams of downsampler 1500 and upsampler 1600 functions, respectively. Each of the downsampler 1500 and the upsampler 1600 includes an LO frequency generator 1510, 1610 and a resampling rate generator 1520, 1620.

Integer Ratio Generator

Figure 17:
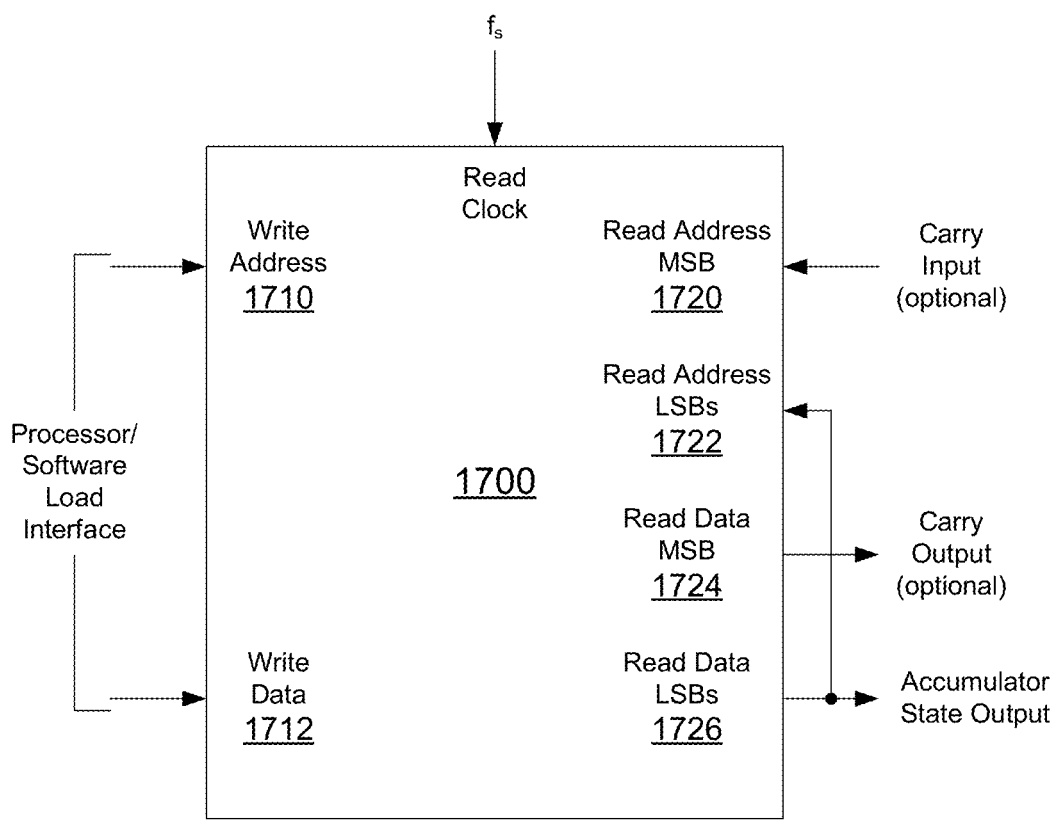
FIG. 17 is a functional block diagram of an integer ratio generator.

The LO frequency and resampling rate generators shown in FIGS. 15 and 16 are each composed of one or more Integer Ratio Generator stages. FIG. 17 is a functional block diagram of an integer ratio generator 1700 which uses a dual port RAM pre-loaded by software to implement an integer modulo D (denominator) accumulator algorithm with a positive or negative input designated N (numerator). When clocked at sample rate frequency $f_S$, the output frequency $f_O$ is exactly equal to $f_S*(N/D)$.

During initialization, the dual port RAM is loaded with all possible accumulator output sequences by the processor/software through the write (left side) ports 1710, 1712. During operation, the read (right side) port data register output LSBs 1726 reflect the current state of the modulo D accumulator. This value is wrapped back to the read port address input LSBs 1722. This accesses the next accumulator state determined by the current state and N/D values used by the initialization algorithm.

A carry input from a previous (less significant) generator stage can optionally be provided through the inclusion of an additional read port address register input MSB 1720. The software initialization algorithm adds (N positive) or subtracts (N negative) an additional factor of one whenever this input is high.

The optional carry output can be connected to a subsequent (more significant) generator stage, or can be used as a digital output frequency signal. The carry output is provided by the addition of another read port data register output MSB 1724, and is controlled through the software initialization algorithm.

Resampling Rate Generator Application

The resampling rate generators 1520, 1620 shown in FIGS. 15 and 16 for the tuner/translator use a single integer ratio generator stage. The RAM size for each is 2K×12 bits, including a carry (digital frequency) output but no carry input. The 11 read port address bits and 11 LS data register bits represent a maximum of 2048 accumulator states. To produce all of the required output rates/bandwidths, one of six different D values from 720 to 1800 combined with an N value between just over D/2 to D−1 are used. This allows a total of 3260 exact bandwidth settings from 36 MHz down to 10 kHz, each with 3 decimal digits of bandwidth control resolution.

The resampling rate generator accumulator state output is also used to look up delay control coefficients for the corresponding asynchronous resampling FIR filter.

The 2K×12=24K bit RAM can be implemented with one to three RAM blocks in a typical FPGA. Even relatively low cost/small FPGAs generally provide hundreds of these blocks, so implementation of this structure isn't normally an FPGA resource issue.

LO Frequency Generator Application

The LO frequency generators 1510, 1610 shown in FIGS. 15 and 16 for the tuner/translator provide a frequency control resolution of 1 Hz using a 40 MHz reference clock ($f_s$). They are each implemented with three cascaded carry in/out integer ratio frequency generator stages. The fixed denominator values for each stage are 160 (MS), 500, and 500 (LS). The overall total denominator ($D_T$) value is then 160*500*500=40e6, providing a 40 MHz/40e6=1 Hz tuning resolution.

The most significant stage provides up to 256 states (160 used) with a carry input but no carry output, requiring a 512×8 bit (4K bit) dual port RAM. The 8 read port data register bits are wrapped back to the 8 read port LS address bits, with the MS address bit functioning as the carry in from the previous (less significant) stage.

The middle/least significant stages each provide up to 512 states (500 used) with a carry input and output, so each is implemented with a 1K×10 (10K bit) RAM. The 9 LS read port register data bits are wrapped back to the 9 MS address bits. The MS read data register output and address input bits are used to indicate carry output and input respectively.

Since these RAMs are smaller than those used for the resampling rate generators, they also do not typically present an FPGA resource issue.

To obtain an accumulator output value with sufficient resolution to address sine and cosine LUTs, the two most significant stage accumulator state outputs are combined and scaled to obtain a binary phase value for the sine/cosine LUTs.

The N values for each generator stage are computed using an iterated integer quotient/remainder division algorithm with the requested output frequency, $f_S$, and pre-assigned D values as inputs.

The above description of the disclosed implementations is provided to enable any person skilled in the art to make or use the claimed invention. It is to be understood that the description and drawings presented herein represent exemplary implementations of the disclosure and are therefore representative of the subject matter which is broadly contemplated by the present disclosure. It is further understood that the scope of the present disclosure fully encompasses other implementations and that the scope of the present invention is accordingly limited by nothing other than the appended claims.

The invention claimed is:

1. A spectral network system for transmission and reception of multi-band RF signals over a packet-switched network, comprising:
    a down sampler configured to
        extract at least one smaller bandwidth channel from a larger bandwidth channel, and
        convert the at least one smaller bandwidth channel into at least one spectral channel, the at least one spectral channel being a digitized representation of the at least one smaller bandwidth channel;
    a packet encoder configured to encapsulate the at least one spectral channel as encoded packet data, each packet of the encoded packet data including a time of creation (TOC) based on a global time reference and configured for transmission via the packet switched network;
    a packet decoder configured to decapsulate and reconstitute the at least one spectral channel and to provide deterministic latency control of the transmission and reception of the multi-band RF signals based on the TOC of each packet; and
    an up sampler configured to convert the at least one spectral channel into the multi-band RF signals and insert the at least one smaller bandwidth channel into the larger bandwidth channel.

2. The device of claim 1, wherein the packet encoder encapsulates the at least one spectral channel into ANSI/VITA-49 Radio Transport Standard (VRT) packets.

3. The device of claim 2, wherein the packet encoder implements and manages the at least one spectral channel using Packet Forward Error Correction (P-FEC) techniques.

4. The device of claim 3, wherein the packet encoder is further configured to add the P-FEC techniques to the VRT packets by arranging the VRT packets into interleaved parity groups.

5. The device of claim 2, wherein in-phase and quadrature samples of the VRT packets are inserted into the at least one spectral channel with unused bits between the samples.

6. The device of claim 5, wherein each in-phase and quadrature sample is a fixed-point signed number, and a number of bits per sample is adjustable based on a signal-to-noise ratio required by processing equipment at a remote destination.

7. The device of claim 2, wherein the packet decoder is further configured to decapsulate and decode the encapsulated and encoded message data using a VRT parity packet for each of a plurality of groups of VTR packets.

8. The device of claim 1, further comprising
    an automatic failover unit including at least one of a passive splitter and a passive combiner,
    wherein the passive splitter is configured to split the at least one spectral channel into a plurality of source signals for diversity.

9. An apparatus for transmission and reception of multi-band RF signals over a packet-switched network, the apparatus comprising:
    means for converting one or more radio frequency signals into at least one spectral channel, the at least one spectral channel being a digitized representation of the one or more radio frequency signals;
    means for encapsulating the at least one spectral channel as encoded packet data, each packet of the encoded packet data including a time of creation (TOC) based on a time reference to preserve timing for the converted radio frequency signal during transmission via the packet switched network;
    means for transporting the radio frequency signal as the internet protocol packets via a terrestrial packet switched network;
    means for decapsulating and reconstituting the at least one spectral channel to provide deterministic latency control of the internet protocol packets based on the TOC;
    means for converting the internet protocol packets into the one or more radio frequency signals.

10. The apparatus of claim 9, wherein the terrestrial packet-switched network comprises a radio transport standard including an ANSI/VITA-49 standard.

11. The apparatus of claim 9, further comprising
    means for seamless switching of data streams between different antenna and modem equipment to support antenna and processing site diversity.

12. The apparatus of claim 9, further comprising
    means for converting from internet protocol to analog for one of legacy modems or spectrum analysis.

13. The apparatus of claim 9, further comprising
    means for at least one of splitting, recombining, and moving of the multi-band RF signals between different sources, destinations and frequencies.

14. The apparatus of claim 9, further comprising
    means for performing packet forward error correction.

15. The apparatus of claim 9, further comprising
    means for providing digitized representations of a slice of a multi-band RF spectrum.

16. The apparatus of claim 15, further comprising
    means for characterizing the means for providing digitized representations by a center frequency and a bandwidth.

17. The apparatus of claim 15, further comprising
    means for subdividing the means for providing digitized representations into at least one smaller bandwidth channel.

18. The apparatus of claim 17, wherein the means for subdividing comprises
    means for extracting the at least one smaller bandwidth channel from a larger bandwidth channel.

19. A method for transporting radiofrequency (RF) signals over a packet-switched network, the method comprising:

receiving, at a first spectral network device, an RF transmission from a spectral channel source, the RF transmission having a bandwidth and two or more RF signals spanning one or more RF spectra, the two or more RF signals comprising message data, the message data having one or more analog RF signals;

extracting a first RF signal and a second RF signal of the two or more RF signals from the RF transmission, the first RF signal and the second RF signal comprising less than the bandwidth;

converting the first RF signal in into a first spectral channel as a digitized representation of the first RF signal and the second RF signal into a second spectral channel as a digitized representation of the second RF signal;

encapsulating the first spectral channel and the second spectral channel as encoded packet data using packet forward error correction (P-FEC), each packet of the encoded packet data including a time of creation (TOC) based on a global time reference and configured for transmission via the packet switched network;

transmitting, by the first spectral network device, the encoded packet data to at least a second spectral network device via the packet-switched network; and decapsulating and reconstituting the first spectral channel and the second spectral channel at the at least a second spectral network device; and converting the at least one spectral channel into the one or more multi-band RF signals.

20. The method of claim 19 further comprising:

inserting the at least one smaller bandwidth channel into the larger bandwidth channel; and providing deterministic latency control of the transmission of the first spectral channel and the second spectral channel from the source to the sink, based on the TOC of each packet.

* * * * *